Patented Mar. 29, 1932

1,851,861

UNITED STATES PATENT OFFICE.

FLOYD J. METZGER, OF NEW YORK, N. Y., ASSIGNOR TO AIR REDUCTION COMPANY, INCORPORATED, OF NEW YORK, N. Y., A CORPORATION OF NEW YORK

PROCESS OF TREATING METALS

No Drawing.     Application filed March 9, 1928. Serial No. 260,552.

This invention relates to the treating of metal articles, and more particularly to the treating of steel articles for the purpose of hardening the surfaces of the same.

It has long been known that iron and steel articles could be surface hardened by treating them with ammonia at a high temperature. Gaseous ammonia, however, is rapidly dissociated at the high temperatures required, and it is therefore necessary to supply ammonia gas continuously during the treating process. Special and elaborate apparatus equipment is required for carrying out this ammonia treating process and for supplying ammonia when gaseous ammonia is employed. The advantages of the hardening treatment with ammonia are offset to a considerable extent by the expensive apparatus and equipment required, and commercial operations are seriously hampered.

The present invention provides an improved method of hardening metals at high temperatures without the need of special apparatus for supplying gaseous ammonia and bringing it into contact with the metal articles at a high temperature; and which is moreover simple and advantageous in its application.

According to the present invention, ammonia is generated in situ in contact with or in close proximity to the heated metal surfaces of the articles to be hardened.

I have found that the surfaces of metal articles can be advantageously and readily hardened by bringing the heated surfaces of the article to be hardened into contact with a material or composition which will give off ammonia at the high temperature, so that the ammonia will be produced in a nascent state in contact with or close proximity to the heated metal surfaces.

I have found that calcium cyanamid can be advantageously employed for such treatment, by causing water vapor or steam to act upon the hot calcium cyanamid while it is in contact with or close proximity to the hot surface to be hardened, thereby causing ammonia to be formed as the result of the reaction. This formation of ammonia can be made continuous and progressive so that the hardening process can be continued for relatively long periods of time, or for such periods of time as may be required for the desired hardening of the metal surfaces.

According to one method of carrying out the invention, the metal articles are buried in calcium cyanamid while they are at the necessary high temperature, or the metal articles and calcium cyanamid are heated to the necessary temperature, and steam in regulated amounts if caused to come into contact with the calcium cyanamid, with the resulting generation of ammonia in contact with or in close proximity to the metal surfaces. In this way, an atmosphere of ammonia is continuously generated, and the operation can be continued for the necessary time, by supplying a sufficient quantity of calcium cyanamid, and by introducing a regulated current of steam.

The generation of ammonia from the calcium cyanamid can also be effected by the use of substances containing combined water which is given off as water vapor or steam at elevated temperatures, and by admixing such materials with the calcium cyanamid, and heating the mixture to the necessary high temperature to set free the combined water so that it can react upon the calcium cyanamid to form ammonia.

The temperature at which the generation of ammonia and treatment of the metal surfaces therewith takes place can be varied, e. g., from temperatures around 400° C. or lower in some cases, to temperatures around 600° C. or higher. The limiting upper temperature is that which will cause objectionable attack of the metal surfaces by the steam, and the temperature of treatment should be kept below that at which such objectionable attacking of the metal surfaces will take place.

At the high temperatures at which the treatment of the hot metal surfaces takes place, the equilibrium between ammonia and its decomposition products, nitrogen and hydrogen, is such that only a small amount of ammonia remains undecomposed. For example, at a temperature of 500° C. and at atmospheric pressure, there is present about 0.13% of ammonia at equilibrium with nitrogen and hydrogen. The generation of ammonia in the process of the present invention is therefore accompanied by decomposition of a large part of the ammonia generated. However, the continuous generation of ammonia in contact with or in close proximity to the heated metal surfaces maintains a fresh supply of ammonia.

The mechanism of the reaction of the ammonia or of its decomposition products or both upon the metal surfaces is somewhat obscure, but it seems probable that the continuous generation of ammonia is accompanied by continuous decomposition of the ammonia generated so that both the ammonia and its decomposition products are present in a nascent or highly reactive condition such that they can advantageously act upon the hot metal surfaces to effect the hardening thereof.

The process of the present invention has the important practical advantage over processes heretofore proposed for hardening metal articles with gaseous ammonia that the need for gas tight equipment is eliminated.

The equipment at present in use for the treatment of metals by carburizing processes employing solid materials can be employed without any substantial changes or alterations for carrying out the invention. Metal articles such as gear wheels and the like, can be buried in calcium cyanamid contained in ordinary pots or containers of the kind commonly used for case hardening, and the pot or container then heated to the necessary temperature for hardening, e. g. around 500 to 600° C., for the necessary period of time, while steam is passed into the container to react with the calcium cyanamid to generate ammonia, in case a substance containing combined water is not admixed with the calcium cyanamid.

In case the gears or other articles are buried in a composition containing calcium cyanamid admixed with a substance containing combined water, the heating of the container with the articles therein buried in the composition will result in the generation of ammonia from the setting free of water vapor and the reaction of the water vapor upon the cyanamid, thus providing ammonia for action upon the metal surfaces either as such or through its decomposition products to bring about the hardening of the metal surfaces.

The calcium cyanamid employed in the process may be the crude commercial cyanamid. As taken from the furnaces, it contains approximately 20 to 25% nitrogen in the form of cyanamid, about 12% lime, and about 12% carbon, in addition to small quantities of impurities derived from the raw material. It is customary, before marketing the crude cyanamid, to partially hydrate the free lime present and at the same time decompose any unacted upon carbide present in the crude product, and finally to add a small amount of mineral oil to obviate inconveniences due to dusting. The crude product thus marketed is suitable for use in the process of the present invention.

When the calcium cyanamid is to be employed without admixture of water-containing substances, it is applied to the metal surfaces, or the articles are buried in the calcium cyanamid, and steam is introduced into the calcium cyanamid while the cyanamid and metal article are heated to the required temperature for the hardening of the metal surfaces by the ammonia or its decomposition reaction products.

If only a limited surface hardening is desired, for example, to impart rust proof properties or corrosion resistance to the metal surfaces, a thick slurry or paste of the cyanamid can be applied to the surfaces of the cold articles and dried to remove the water or the vehicle and the thus coated article can be heated to the necessary temperature in an atmosphere of water vapor or steam which will react with the layer of calcium cyanamid applied to the metal surfaces and cause the generation of ammonia or action upon the metal surfaces either as such or through its decomposition or reaction products; or a layer containing both calcium cyanamid and a substance containing combined water can be similarly applied.

Where a more prolonged action is desired for effecting a further hardening or a deeper hardening of the metal surfaces, the articles can be buried in calcium cyanamid in a suitable container, such as is commonly employed for case hardening purposes, and the steam introduced into the container while it is heated to the necessary temperature so as to generate ammonia continuously for the required period of time.

When calcium cyanamid is admixed with another material, or with other materials, containing combined water, the material or materials should be such as will give off their combined water at the necessary high temperature. Among the materials containing combined water may be mentioned metal hydroxides or hydrated metal oxides, such as hydrated lime or calcium hydroxide, hydrated oxides of iron or aluminum, etc. as well as other water-containing substances such as talc, zeolites, etc. which contain water of combination and which give off water at high temperatures, such as are required for the hardening of metal surfaces with ammonia or its reaction or decomposition products.

The proportions of calcium cyanamid and of substances containing combined water can be varied, using such proportions as will give as nearly as possible complete liberation of ammonia from the calcium cyanamid, or using an excess of either the calcium cyanamid or of the water-containing substance.

The ingredients can be admixed with each other or in some cases they can be applied as alternate layers since the driving off of water from the water-containing substances supplies water vapor or steam which will readily come into contact with adjacent calcium cyanamid.

The employment of a composition containing calcium cyanamid and substances with combined water has the advantage that the composition can be prepared and stored and shipped and used in the hardening of metals according to procedure now commonly followed in case hardening, that is, by burying the articles to be hardened in the hardening composition and heating the container with the articles and composition to the necessary temperature for the necessary time.

In addition to the calcium cyanamid and the water-containing substances, other constituents may be added to the mixture for other purposes, such as carbon, carbonaceous materials, barium carbonate or other carbonates, subdivided metals or oxides of metals, etc. The nature and composition of the admixtures to be employed will depend upon the results to be accomplished, for example, if case hardening by carbon-containing substances is desired, in addition to the hardening by the action of ammonia or its decomposition or reaction products, carbon or carbonaceous materials may be incorporated in the composition along with calcium cyanamid and the substances containing combined water.

Different metal articles can be hardened or treated according to the present invention. In some cases, the treatment may be carried only so far as to produce a rust resistant or corrosion resistant surface on the articles treated. In other cases, the treatment may be sufficient to give a hardened wearing surface, as in the case of gears or other machined articles such as have heretofore been subjected to case hardening to provide them with hardened wearing surfaces. Articles such as gears, etc. may be heat treated, machined and finished before subjected to hardening according to the present invention.

The application of the process of the present invention will be further illustrated by the following specific examples and more detailed description.

A steel article machined and finished and having the following composition: Mo—0.85%; Al—2.50; C—0.19; Mn—0.60 was embedded in commercial calcium cyanamid contained in a treating chamber and maintained at a temperature of about 500° C. for fourteen hours, while a small regulated amount of steam was continuously introduced into the container and into contact with the calcium cyanamid. At the end of this period, the temperature was allowed to drop to about 200° C. when the article was removed.

The treated article had a changed appearance, the surface having taken on a bluish and bronze-like color and tests showed that the surface had been rendered resistant to rusting and corrosion without measurably distorting or warping the article. It had a hard surface and scratched glass with ease; and it was also resistant to scratching with a file. Another article of the same steel when treated for a longer period of time showed greater hardness.

Another article of the same steel was embedded in a composition comprising two parts by weight of hydrated lime and one part commercial calcium cyanamid and subjected to the same temperature conditions for the same period of time with similar results.

Articles made of a steel containing C, 0.46%; Mn, 0.68%; Mo, 0.19%; S, 0.029%; P, 0.015%, when subjected to similar treatment, were provided with hardened surfaces. Another steel containing chromium, nickel and aluminum was similarly treated with the imparting thereto of a hardened surface.

Various other commercial steels such as tool steels and alloy steels can be treated according to the process of the present invention to impart corrosion or rust resisting surfaces thereto, or improved hardened wearing surfaces.

In the treatment of the above examples, a temperature of 500° C. was employed. I have also successfully treated steels at lower as well as at higher temperatures. For example, test bars of a molybdenum steel containing 2.5% aluminum were treated for twenty-four hours at varying temperatures with the following results:

| Temp. °C. | Hardness Brinnel |
|---|---|
| Untreated | 175 |
| 470 | 184 |
| 500 | 337 |
| 550 | 391 |
| 600 | 479 |

The most satisfactory temperature for treatment of the articles depends somewhat upon the composition and nature of the steeel and also upon the object or objects to be attained. In general, the higher temperatures will bring about hardening in shorter periods of time, but at the higher temperatures other effects may be attained such as warping, change of grain structure, etc. which in some cases are unobjectionable. Where hardening without warping or distortion is desired, the process of the present invention enables hardness to be obtained without them, by the employment of suitable low temperatures e. g. around 500° C. or somewhat higher.

Mixtures of calcium cyanamid and of materials such as hydrated lime do not materially change in physical state on use. They do not flux or sinter or otherwise become agglomerated. If introduced into the process in powdered or granular form they remain in substantially the same condition after use. Such materials can be stored and shipped and kept on hand for use as required.

The treating mixture employed in one operation may not be exhausted and may be used over again, fortified when necessary by admixing therewith or adding thereto additional amounts of such constituents as have been used up in previous operations. If, for example, the calcium cyanamid is only partly used up in one treatment, additional hydrated lime can be added, either without or with additional cyanamid, or the mixture of calcium cyanamid and lime resulting from the operation can be hydrated in part or in whole, thus forming hydrated lime from the lime produced by the earlier operations which can be employed in the further carrying out of the process.

Where the calcium cyanamid is entirely used up in the process, and where hydrated lime is employed in admixture with it, the residue from the process will be made up largely if not completely of lime, which can be hydrated and employed in admixture with additional calcium cyanamid in the further carrying out of the process. Other materials which are similarly capable of rehydration can be employed over again by subjecting the residues from prior operations to rehydration by the addition of water. If other substances than lime are employed, and the residue is rehydrated, the rehydrated mixture will contain the rehydrated substance as well as the hydrated lime, and, in such cases, evolution of ammonia due to the water given off by the hydrated lime acting upon the calcium cyanamid may be at a different temperature from that resulting from the giving off of water from the other substance.

When undecomposed calcium cyanamid is present in the residue subjected to rehydration, care should be taken to carry out the operation at as low a temperature as practicable in order to minimize the loss of nitrogen from the cyanamid in the form of ammonia during rehydration. A convenient method of accomplishing this hydration, in case lime is used, is to expose the material to the atmosphere and allow it to air-slake, turning over the material if desirable to hasten the process.

In the specific examples above given, the materials were employed in powdery or granular form and in containers of the kind employed for case hardening. The calcium cyanamid, or the mixture of calcium cyanamid and water-containing substances, may in some cases be applied in the form of a paint or covering by forming the composition into a paste or paint and applying this to the surface of the materials to be treated. If water is employed in forming the paste or paint, the coated surface should be dried at a low temperature to avoid decomposition of the calcium cyanamid by the water on heating. Instead of using water, the paste or paint may be made with an organic vehicle which will volatilize or which may remain and be in part volatilized and in part carbonized during the heating treatment.

The process of the present invention differs materially in its operations and in its results from the well known processes of hardening in which cyanide is employed at high temperature in fused or semi-fused condition, and represents a material improvement over such processes. The process of the present invention is also differentiated from processes employing calcium cyanamid in fused form with alkali salts as fluxing agents at high temperature, wherein the primary reaction in the production of alkali cyanides by well known reactions, and where the hardening effect is that of a cyanide treatment.

I do not claim herein broadly the generation and utilization of ammonia at high temperatures by causing water vapor or steam to act on calcium cyanamid, insmuch as this forms the subject of my companion application, Serial No. 260,551, of which broad process the process of the present invention is a specific application. Nor do I claim herein the composition employed in the process of the present invention since that composition is also claimed in said companion application.

I claim:—

1. The method of treating metal articles which comprises heating the articles in contact with calcium cyanamid and causing water vapor to come into contact with the calcium cyanamid at a sufficient temperature to generate ammonia and to harden the metal surfaces.

2. The method of treating metal articles which comprises heating the articles in contact with calcium cyanamid and supplying steam at a regulated rate to react with the calcium cyanamid.

3. The method of treating metal articles which comprises heating the articles in contact with a composition containing calcium cyanamid and a substance which gives off water at the temperature employed and which will not substantially react with the metal articles, the heating of the articles being to a temperature which will cause hardening of the surfaces thereof by the reaction product of the water vapor upon the calcium cyanamid.

4. The process of treating metal articles which comprises heating the articles in contact with a composition containing commercial calcium cyanamid and hydrated lime at a temperature above 400° C.

5. The method of treating metal articles which comprises embedding the articles in a composition containing calcium cyanamid and a substance containing combined water which will give off the combined water at a high temperature and which will not substantially react with the metal articles, and heating the articles so embedded to a temperature sufficient to decompose the calcium cyanamid by the water given off from such substance and to harden the metal surfaces with the resulting decomposition products.

6. The method of treating metal articles which comprises embedding the same in a composition containing calcium cyanamid and hydrated lime and heating the embedded articles to a temperature sufficient to decompose the cyanamid by water vapor given off from the hydrated lime and to harden the surfaces of the articles with the resulting decomposition products.

7. The process of treating metal articles which comprises heating the articles in contact with a composition containing commercial calcium cyanamid and hydrated lime, subjecting the lime of the composition after use to rehydration, and employing the rehydrated lime in admixture with calcium cyanamid in the further treatment of metal articles.

8. The method of hardening articles made of steel alloys containing molybdenum which comprises embedding the articles in a composition containing calcium cyanamid, heating the articles so embedded to a temperature in excess of 400° C. and causing water vapor to come into contact with the calcium cyanamid to decompose the same continuing the treatment for a prolonged period of time, allowing the temperature to decrease at the end of the period and withdrawing the articles from the composition.

In testimony whereof I affix my signature.

FLOYD J. METZGER.